(12) United States Patent
Ortmann et al.

(10) Patent No.: US 9,108,501 B2
(45) Date of Patent: Aug. 18, 2015

(54) MULTI-MODE POWERSPLIT POWERTRAIN FOR ELECTRIC VEHICLE

(75) Inventors: Walt J. Ortmann, Saline, MI (US); Brandon R. Masterson, Dexter, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 995 days.

(21) Appl. No.: 13/176,079

(22) Filed: Jul. 5, 2011

(65) Prior Publication Data

US 2013/0012347 A1 Jan. 10, 2013

(51) Int. Cl.
*F16H 3/72* (2006.01)
*B60K 6/387* (2007.10)
*B60K 6/442* (2007.10)
*B60K 6/445* (2007.10)
*B60K 6/38* (2007.10)

(52) U.S. Cl.
CPC ............... *B60K 6/387* (2013.01); *B60K 6/442* (2013.01); *B60K 6/445* (2013.01); *B60K 2006/381* (2013.01); *Y02T 10/6234* (2013.01); *Y02T 10/6239* (2013.01)

(58) Field of Classification Search
CPC ......... B60K 6/442; B60K 6/445; B60K 6/387
See application file for complete search history.

(56) References Cited

U.S. PATENT DOCUMENTS

| 5,558,595 | A | | 9/1996 | Schmidt et al. |
| 5,775,449 | A | * | 7/1998 | Moroto et al. ............. 180/65.235 |
| 5,788,006 | A | * | 8/1998 | Yamaguchi ............... 180/65.235 |
| 5,839,533 | A | * | 11/1998 | Mikami et al. ................ 180/165 |
| 5,856,709 | A | * | 1/1999 | Ibaraki et al. ..................... 475/5 |
| 5,899,286 | A | * | 5/1999 | Yamaguchi ................. 180/65.21 |
| 6,407,521 | B1 | * | 6/2002 | Raftari et al. ............. 318/400.21 |
| 6,427,794 | B1 | * | 8/2002 | Raftari et al. ............. 180/65.235 |
| 6,603,215 | B2 | * | 8/2003 | Kuang et al. ................. 290/40 C |
| 7,128,677 | B2 | * | 10/2006 | Supina et al. ..................... 475/5 |
| 7,175,555 | B2 | * | 2/2007 | Kozarekar et al. ................. 475/5 |
| 7,576,501 | B2 | * | 8/2009 | Okubo et al. ................. 318/139 |
| 7,694,762 | B2 | * | 4/2010 | Supina et al. ............... 180/65.25 |
| 2002/0023790 | A1 | * | 2/2002 | Hata et al. ..................... 180/65.3 |
| 2004/0121870 | A1 | * | 6/2004 | Takenaka et al. ................. 475/5 |
| 2008/0078591 | A1 | * | 4/2008 | Schondorf et al. ........... 180/65.2 |
| 2013/0012347 | A1 | | 1/2013 | Ortmann et al. |

* cited by examiner

*Primary Examiner* — Derek D Knight
(74) *Attorney, Agent, or Firm* — David B. Kelley; MacMillan, Sobanski & Todd, LLC

(57) ABSTRACT

A powertrain includes a countershaft, a gearset including a sun gear, a carrier connected to an engine, a ring gear releasably held against rotation and connectable to the countershaft, and pinions supported on the carrier and meshing with the sun gear and ring gear, an electric machine connected to the sun gear and connectable to the countershaft, and a second electric machine driveably connected to the countershaft.

13 Claims, 3 Drawing Sheets

| | 70 | 72 | 78 |
|---|---|---|---|
| 1 Motor Electric Drive | O | O | O |
| 2 Motor Electric Drive | O | X | O |
| Series | O | O | X |
| Powersplit | X | O | O |
| Direct Drive 1 | X | X | O |
| Direct Drive 2 | O | X | X |

MULTI-MODE POWERSPLIT POWERTRAIN FOR ELECTRIC VEHICLE

BACKGROUND OF THE INVENTION

1. Field of the Invention

This invention relates generally to a powersplit powertrain for an extended range electric vehicle.

2. Description of the Prior Art

The powertrain of a hybrid electric vehicle (HEV) includes an engine, electric motor/generator and traction battery, wherein the engine and motor can drive the wheels individually, the engine can charge the traction battery through the electric machine operating as a generator, and vehicle kinetic energy can be recovered and regenerated using the wheel brakes to drive the generator and recharge the battery.

An extended range electric vehicle (EREV) operates completely electrically while the battery charge is being depleted.

In the powertrain for a plug-in hybrid (PHEV), the traction battery is significantly increased in capacity so that electrical energy from the electric grid can be used to drive the vehicle. As a result, a much greater use of electric drive is expected. The direct connection of the generator to the wheel speed causes the generator shaft to rotate as the vehicle moves when the engine is off. This causes several issues including (i) as the vehicle increases in speed, the generator speed gets excessively high causing a durability concern for the bearing, planetary gearset and generator; (ii) lowering of available torque needed to start the engine; (iii) since the generator is not being used, it generates an unnecessary spin loss; and (iv) in reverse gear with the engine running, the motor must react, thereby reducing the torque provided to the wheels.

SUMMARY OF THE INVENTION

A powertrain includes a countershaft, a gearset including a sun gear, a carrier connected to an engine, a ring gear releasably held against rotation and connectable to the countershaft, and pinions supported on the carrier and meshing with the sun gear and ring gear, an electric machine connected to the sun gear and connectable to the countershaft, and a second electric machine driveably connected to the countershaft.

With this strategy, the motor and battery are not sized to drive entirely with electrical energy during the charge depleting mode. Instead, the engine is operated in high wheel torque pedal demand situations to keep components size, and thus cost, lower and to provide better value.

In a charge sustaining mode, the engine runs in either a series mode or a powersplit mode.

The powertrain provides full torque to the wheels from the traction motor, a benefit over a single mode powersplit powertrain.

The powertrain provides the high fuel economy and driveability of a powersplit powertrain with improved towing and vehicle launch capability.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
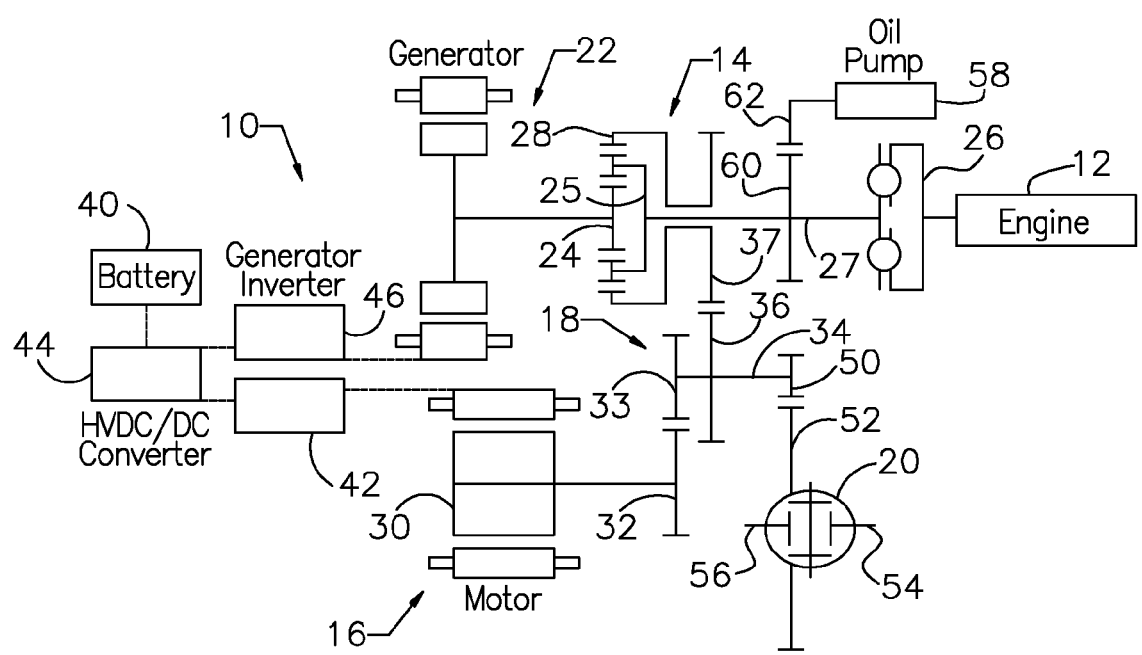
FIG. 1 is a schematic diagram of a HEV powertrain.

Referring now to the drawings, FIG. 1 illustrates a HEV powertrain 10 having a power flow architecture commonly known as powersplit. Powertrain 10 includes an engine 12; planetary gearset 14; electric machine 16, driveably connected to the vehicle wheels through layshaft gearing 18; differential mechanism 20; and electric machine 22. Each electric machine 16, 22 is a motor-generator, although conventionally electric machine 16 is referred to as a motor or traction motor, and electric machine 22 is referred to as a generator.

The planetary gearset 14 directs the engine power to either an electric drive path or a mechanical drive path. The sun gear 24 of the planetary gearset 14 is connected to the generator 22. The carrier 25 of the planetary gearset 14 is connected to the engine 12 through a torsion damper 26 and shaft 27. The ring gear 28 is connected to countershaft 34 and layshaft gear pair 36-37. The rotor 30 of motor 16 is connected to countershaft 34 through the layshaft gear pair 32-33.

Motor 16 is electrically connected to a traction battery 40 through an inverter 42 and a high voltage DC/DC converter 44. Similarly generator 22 is electrically connected to battery 40 through an inverter 46 and converter 44.

Countershaft 34 is connected through a pinion 50 and ring gear 52 of the differential mechanism 20, which transmits power to the vehicle wheels through halfshafts or axle shafts 54, 56.

An oil pump 58 is driveably connected to carrier 25 and the engine output by a pinion 60 and gear 62.

Figure 2:
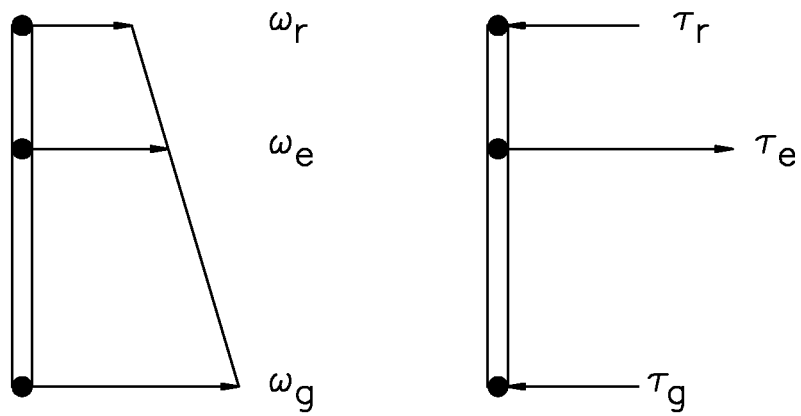
FIG. 2 is lever diagram of the planetary gearset of the powertrain of FIG. 1.

FIG. 2 illustrates a lever diagram to visualize operation of planetary gearset 14 in a powersplit mode, wherein r represents the ring gear 28 connected to traction motor 16, e represents the planet carrier 25 connected to engine 12, g represents the sun gear 24 connected to generator 22, ω represents angular velocity, and τ represents torque.

Figure 3:
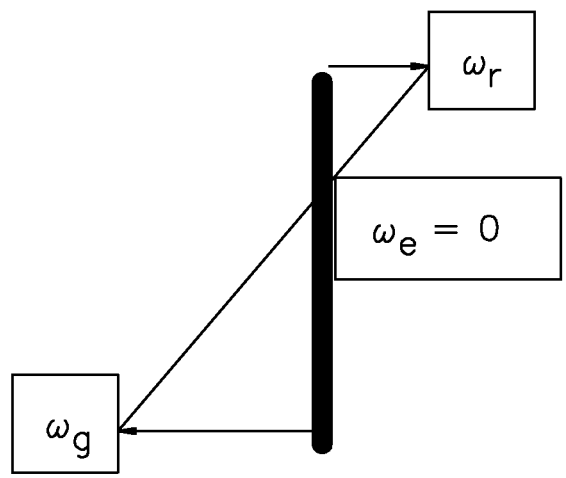
FIG. 3 is lever diagram of the gearset during an engine-off condition.

FIG. 3 shows a lever diagram for the engine off condition of powertrain 10. When the speed of engine 12 is zero, generator 22 rotates in the opposite direction relative to the motor. In general, the generator's speed is about two to three times faster than the motor's speed. In the lever diagram of FIG. 3, $\omega_r$ is the speed of ring gear 28, which is a function of vehicle speed; $\omega_e$ is the speed of engine 12; and $\omega_g$ is the speed of sun gear 24 and generator 22=$-\beta^*\omega_r$, wherein $\beta=N_r/N_s$ and N is the number of teeth of the respective gear.

Figures 4, 5:
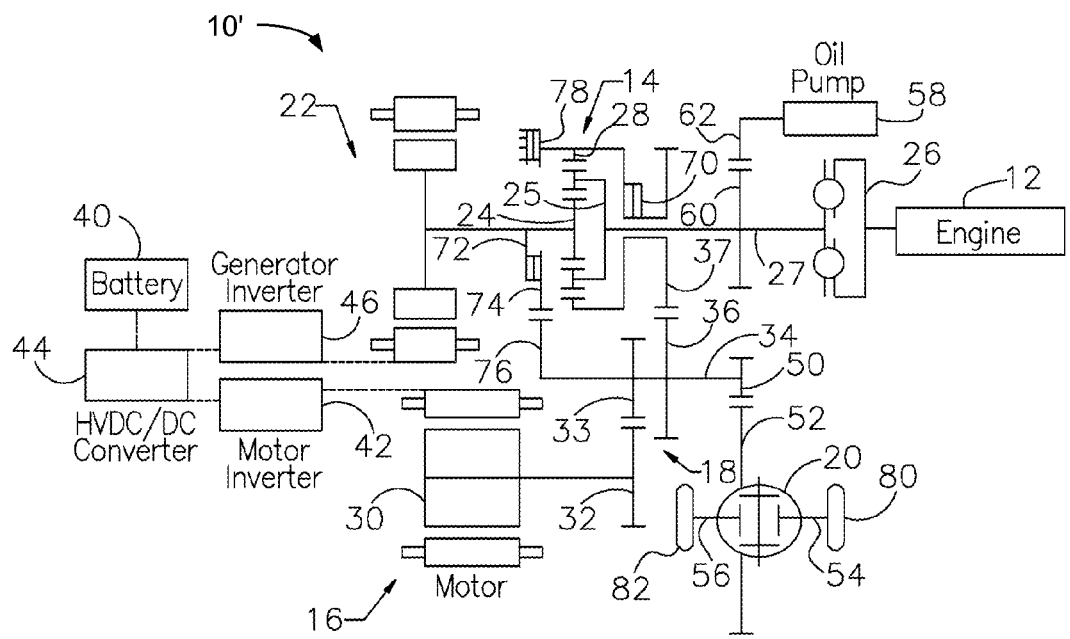
FIG. 4 is a schematic diagram of a PHEV powertrain.
FIG. 5 is a chart showing the engaged and disengaged state of the clutches and brake for various operating modes of the powertrain of FIG. 4.

FIG. 4 illustrates a powersplit powertrain 10' for a PHEV. In FIG. 4 similar components of the powertrain 10 of FIG. 1 are identified by the same reference numbers. A first clutch 70 alternately opens and closes a drive connection between shaft 27 and ring gear 28. A second clutch 72 alternately opens and closes a drive connection between generator 22 and a pinion 74, which meshes with a gear 76, secured to shaft 34. A brake 78 alternately holds ring gear 28 against rotation and releases the ring gear. FIG. 5 is a chart showing the engaged and disengaged state of the clutches 70, 72 and brake 78 for various operating modes of the powertrain 70.

The clutches 70, 72 and brake 78 may be hydraulically-actuated friction disc control element, but are preferably control elements that do not have parasitic losses.

FIG. 5 is a chart showing the engaged and disengaged state of the clutches and brake for various operating modes of the powertrain of FIG. 4.

Mode 1: One Motor Electric Drive

When clutches 70, 72 and brake 78 are disengaged, motor 16 is isolated from the primary axis of shaft 27 and is connected directly to the wheels 80, 82 through layshaft gears 32-33, countershaft 34, layshaft gears 50-52, differential 20. Mode 1 is used to drive the vehicle electrically under most conditions. Losses are minimized due to the planetary gearset 14 and generator 22 not rotating.

Mode 2: Two Motor Electric Drive

When clutch 72 is engaged, and both clutch 70 and brake 78 are disengaged, generator 22 is connected to the countershaft 34 and drives the vehicle wheels 80, 82 through clutch 72, layshaft gears 74-76, countershaft 34, layshaft gears 50-52, and differential 20. Mode 2 is used during electric drive (sometimes called charge depletion) to provide extra power and torque under conditions of high torque demand. Mode 2 allows the traction motor 16 to be downsized to reduce cost and to improve vehicle launch torque.

Mode 3: Series

When brake 78 is engaged and clutches 70, 72 are disengaged; generator 22 is driven through the planetary gearset 14 at about two to three times engine speed due to brake 78 grounding the ring gear 28 and providing a torque reaction. The traction motor 16 is connected directly to the wheels 80, 82 to provide propulsion. Mode 3, used during charge sustaining operation, is of particular benefit in reverse drive so that the reaction to engine torque is not provided by the traction motor 16. Mode 3 allows full torque to the wheels from the traction motor 16, which is a benefit over a single mode powersplit powertrain.

Mode 4: Powersplit

When clutch 70 is engaged, and both clutch 72 and brake 78 are disengaged, the planetary gearset 14 directs the engine power to either an electric drive path or a mechanical drive path. The sun gear 24 of the planetary gearset 14 is connected to the generator 22. The carrier 25 of the planetary gearset 14 is connected to the engine 12 through a torsion damper 26 and shaft 27. The ring gear 28 is connected to countershaft 34 through clutch 70 and layshaft gear pair 36-37. The rotor 30 of motor 16 is connected to countershaft 34 through the layshaft gear pair 32-33.

When the speed of engine 12 is zero, generator 22 rotates in the opposite direction relative to the engine 14. Mode 4 is used in normal charge sustaining operation of the engine 12, motor 16 and generator 22.

Mode 5 and 6: Direct Drive

In mode 5, clutches 70, 72 are engaged and brake 78 is disengaged. In mode 6, clutch 72 and brake 78 are engaged and clutch 70 is disengaged. Engagement of clutch 72 connects countershaft 34 to sun gear 24 and generator 22.

Modes 5 and 6 provide two modes wherein the engine 12 can be directly coupled to the wheels in a fixed gear ratio. In modes 5 and 6, both generator 22 and traction motor 16 can be turned off so that no traction power is transferred into the electrical domain. Depending on the selection of gear ratios, the gears provide improved efficiency within particular driving situations. The direct drive modes provide a benefit in that they produce less heat while towing a load. These modes improve the tow/payload capability of the powersplit powertrain 70.

If the torque capacity of clutch 72 is sufficient to transmit vehicle launch torque, the engine 12 can be used to aid in the launch of the vehicle along with the two motors 16, 22, so that under wheel high torque demand, full engine and battery power are used to drive the wheels during a launch condition.

Although the clutches 70, 72 and brake 78 have been describes as friction control elements, the clutches and brake may be lockable elements, such as dog clutch or brakes or lockable one-way clutches or brake. When the friction clutches and brake are used, they are actuated preferably by a hydraulic servo or an electrical ball/ramp.

In accordance with the provisions of the patent statutes, the preferred embodiment has been described. However, it should be noted that the alternate embodiments can be practiced otherwise than as specifically illustrated and described.

The invention claimed is:

1. A powertrain, comprising:
   a planetary gearset including a sun gear connected to a generator, a carrier driveably connected to an engine, and a ring gear;
   a brake for holding the ring gear against rotation;
   a clutch for driveably connecting the ring gear to a first gear pair engaging a countershaft;
   a motor driveably connected to the countershaft;
   a second clutch for driveably connecting the sun gear and the countershaft via a second gear pair.

2. The powertrain of claim 1, further comprising a differential for transmitting power between the countershaft and vehicle wheels.

3. The powertrain of claim 1, further comprising a third gear pair driveably connecting the motor and the countershaft.

4. The powertrain of claim 3, further comprising a fourth gear pair driveably connecting a differential and the countershaft.

5. The powertrain of claim 1, further comprising a third gear pair driveably connecting a differential and the countershaft.

6. A powertrain, comprising:
   a countershaft;
   a planetary gearset including a sun gear, a carrier connected to an engine, and a ring gear releasably held against rotation and driveably connectable to the countershaft via a first gear pair;
   an electric machine connected to the sun gear and driveably connectable to the countershaft; and
   a second electric machine driveably connected to the countershaft via a second gear pair.

7. The powertrain of claim 6, further comprising a clutch for driveably connecting the ring gear to the countershaft.

8. The powertrain of claim 6, further comprising a second clutch for driveably connecting the sun gear and electric machine to the countershaft.

9. The powertrain of claim 6, further comprising a brake for releasably holding the ring gear against rotation.

10. The powertrain of claim 6, wherein the electric machine and the second electric machine are each a motor-generator.

11. The powertrain of claim 6, further comprising a differential for transmitting power between the countershaft and vehicle wheels.

12. The powertrain of claim 6, further comprising a third gear pair driveably connecting the electric machine and the countershaft.

13. The powertrain of claim 6, further comprising a fourth gear pair connecting a differential to the countershaft.

\* \* \* \* \*